United States Patent [19]

Tanaka

[11] Patent Number: 5,342,222

[45] Date of Patent: Aug. 30, 1994

[54] EARTH END ATTACHING MEMBER IN A FORMED PROTECTOR FOR A WIRE HARNESS

[75] Inventor: Toshiharu Tanaka, Mie, Japan

[73] Assignee: Sumitomo Wiring Systems, Ltd., Yokkaichi, Japan

[21] Appl. No.: 59,355

[22] Filed: May 11, 1993

[30] Foreign Application Priority Data

Jun. 23, 1992 [JP] Japan .............................. 4-049801[U]

[51] Int. Cl.$^5$ .................................................. H01R 9/22
[52] U.S. Cl. ...................................... 439/708; 439/603
[58] Field of Search .................. 439/34, 708, 460, 603, 439/719

[56] References Cited

U.S. PATENT DOCUMENTS 5,073,126 12/1991 Kikuchi et al. .................. 439/460 X

FOREIGN PATENT DOCUMENTS 63-179714 11/1988 Japan .

Primary Examiner—Eugene F. Desmond
Attorney, Agent, or Firm—Sughrue, Mion, Zinn, Macpeak & Seas

[57] ABSTRACT

An object of the present invention is to provide an earth end attaching member 2 in a formed protector 10 for a wire harness, which improves a process for lapping up and securing earth terminals 3 of earth leads 7 thereto. Engaging plates 4 are vertically formed on the opposite sides of the member 2. Cantilever like elastic engaging parts 5A and 5B have a latch portion 12 provided on a free end 11 thereof and on the opposing walls of the plates 4 so that a base end 10 thereof is disposed at an upper position and the free end 11 is directed downwardly. The earth terminals 3 are pressed down from the base end 10 while elastically deflecting the engaging parts 5A and 5B. When the earth terminals 3 are placed on the member 2, the latch portions 12 of the engaging parts elastically engage with the sides of the earth terminals 3, thereby holding the position of the earth terminals lapped on the member 2.

3 Claims, 5 Drawing Sheets

EARTH END ATTACHING MEMBER IN A FORMED PROTECTOR FOR A WIRE HARNESS

BACKGROUND OF THE INVENTION

1. Field of the Invention

This invention relates to an earth end attaching member provided on a formed protector which receives bundles of wires of a wire harness and connecting terminals of earth leads in the protector to a car body with the terminals being lapped and fixed on the member.

2. Statement of the Prior Art

Earth leads are mounted in the formed protector for the wire harness so that terminals of the earth leads are lapped and secured to an earth end attaching member provided on a peripheral wall of the protector. When the formed protector is attached to a car body or the like for arranging the wire harness, the earth end attaching member and the earth terminals are secured to a car body or the like by a common bolt so that an attached position is maintained and the earth leads are electrically earthed on the car body.

There is a means for securing an earth terminal to an earth end attaching member in a formed protector, in which the member is provided with a hinged lid for covering earth terminals positioned on the member and maintaining the position of said earth terminals. As disclosed in Japanese Utility Model Patent Public Disclosure No. 63(1988)-179714 (not examined), the earth end attaching member is provided with a latch portion which is adapted to engage with the outer periphery of the earth terminals by forcing the terminals to be pressed into the latch portion, thereby fixing the lapped earth terminals on the member.

In the prior earth end fixing means, the former hinged lid construction is so complicated that a molded resin protector is relatively expensive to produce and, in addition, cannot fix an earth end by way of a single action. This results in an increase in necessary working steps. The latter construction which functions to force the earth end into a latch portion, results in a fixing operation which is troublesome and inefficient. Incomplete insertion of the earth end sometimes occurs, thereby causing the earth terminals to shift.

SUMMARY OF THE INVENTION

An object of the present invention is to provide an earth end attaching member in a formed protector for a wire harness, which improves a process for lapping and securing earth terminals of earth leads thereto.

In order to achieve the above object, an earth end attaching member in a formed protector for a wire harness, on which earth terminals of earth leads are lapped and secured, in accordance with the present invention, comprises:

a pair of engaging plates integrally formed on said member in spaced and opposed positions; and a pair of cantilever like elastic engaging parts, each part being provided on the opposing wall of each plate so that a base end thereof is disposed at an upper position and a free end thereof is directed downwardly, each part having a latch portion provided on the free end. A spaced distance allowing said earth terminals parallel to said member to be passed therethrough by elastically deforming said parts is defined between said parts. The latch portion engages with the side of said earth terminals lapped on said member.

The above construction may be changed to one in which side walls of the U-channel assembly extend along opposite sides of the earth end attaching member wherein engaging plates, or straps independently provided on the side walls of the U-channel assembly oppose each other and are spaced on opposite sides of the member as engaging plates, or wherein the engaging plates provided independently on the side walls are integrally connected to the elastic engaging parts in a reversed U-shape form.

In the earth end attaching member in the formed protector for the wire harness in accordance with the present invention, since the engaging plates disposed on opposite sides of the earth end attaching member are provided with cantilever like elastic engaging parts having latch portions, the earth terminals are passed between the elastic engaging parts while elastically deforming the elastic engaging parts when the earth terminals are pressed down. The latch portions prevent the earth terminals from moving out of the engaging parts by an elastic force caused in the parts.

Since an amount of deflection of the elastic engaging parts can be set to be wide, the earth terminals can be readily lapped on and secured to the earth end attaching member "with a clink" under a single action of pushing the earth terminals lightly by hand or the like. This is especially true if the stiffness of the elastic engaging parts is set to be low so that resistance of insertion of the earth terminals is low.

The construction in which the independent engaging plates are integrally connected to the elastic engaging parts in the reversed U-shape results in an increase in elasticity of the elastic engaging parts and ease of mounting the earth terminals on the member in a single action.

DETAILED DESCRIPTION OF THE PREFERRED EMBODIMENTS

Figure 1:
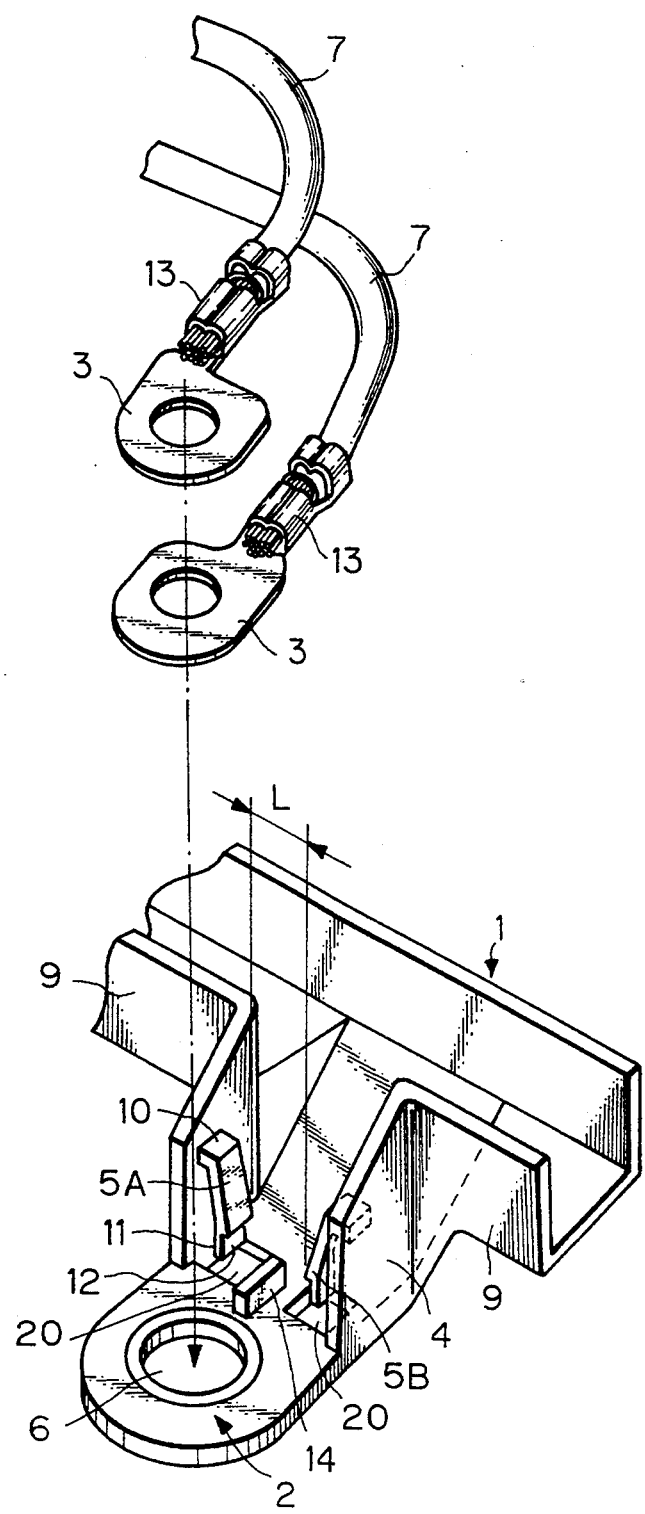
FIG. 1 is a perspective view of an embodiment of an earth end attaching member of a formed protector for a wire harness in accordance with the present invention, illustrating a position prior to attaching earth leads to the member.
Figure 2:
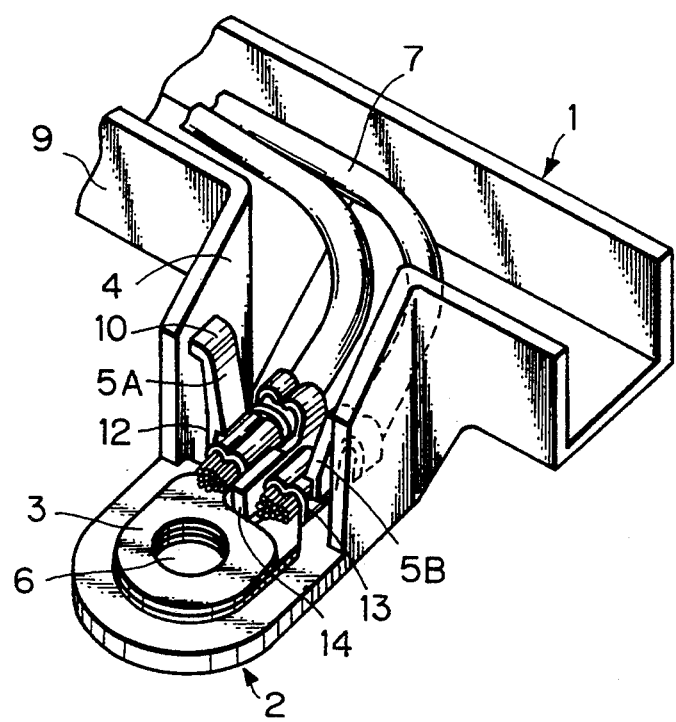
FIG. 2 is a similar view to FIG. 1 illustrating a position after attaching the earth leads to the member.

Referring now to the drawings, embodiments of the present invention will be described in detail below. FIGS. 1 and 2 showing an embodiment of the present invention in which, a formed protector 1 receives bundles of wires of a wire harness and is secured to a car body so as to adjust and maintain an arranged position of the wire harness. A plate like earth end attaching member 2 is integrally formed with the protector 1 and projects from the side of the protector 1. The member 2 is provided with a hole 6 through which a bolt (not shown) is secured to a car body. An earth terminal 3 attached to an earth lead 7 in the formed protector 1 is provided with a hole 6. The earth terminals 3 are lapped on the member 2 so that the holes 6 are coaxially placed.

A common bolt is inserted through the holes 6 and secures the member 1 and the terminals 3 to the car body. Thus, the earth lead 7 in the protector 1 is electrically earthed to the car body through a fixing construction provided with the earth end attaching member 2.

Figure 4A:
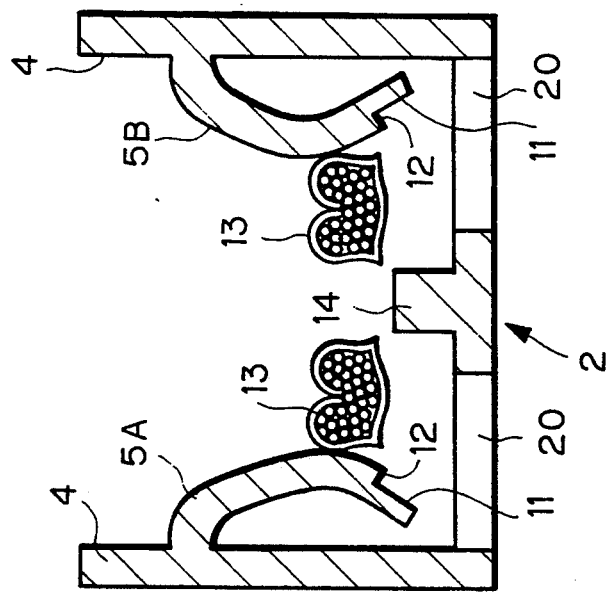
FIGS. 4A to 4D are cross sectional views of the member in FIG. 1 illustrating processes of mounting the earth leads on the earth end attaching member.

The engaging plates 4 stand vertically on and oppose each other on both the side and rear portions of the earth end attaching member 2. The engaging plates 4 in this embodiment are formed so that side plates 9 of the U-channel of the formed protector 1 bend and extend along the earth end attaching member 2. The engaging plates 4 are provided with cantilever like elastic engaging parts 5A and 5B on the inner wall thereof with base portions 10 being integrally connected to the parts 5A and 5B and the lower free end 11 being directed downwardly and disposed symmetrically with respect to the member 2. The parts 5A and 5B are provided with latch portions 12 (see FIG. 4A) which have a reversed L-shape with a shoulder.

Figure 4B:
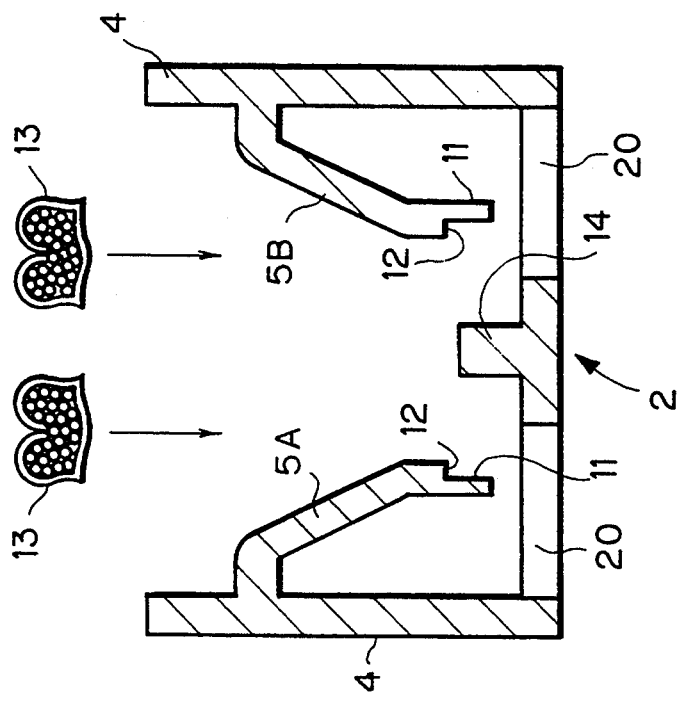
Figures 4C, 4D:
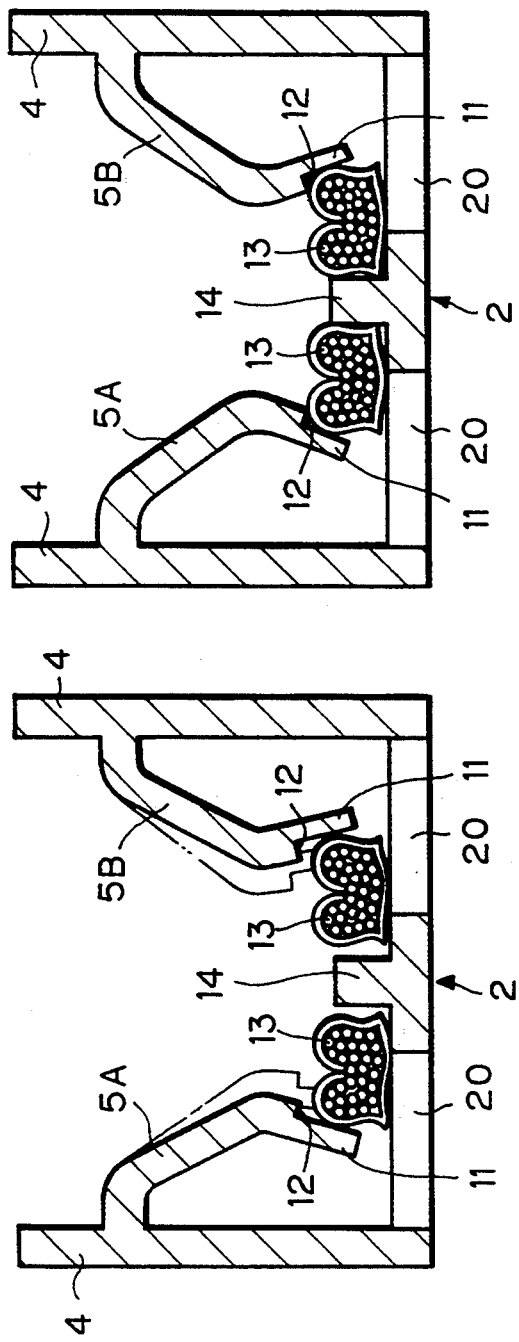

The elastic engaging parts 5A and 5B are elastically deformed toward the engaging plates 4 at the free ends 11 and have the following shape condition. A relative distance L (FIG. 1) is defined between the free ends 11 so that the elastic parts 5A and 5B permit the earth terminals 3 to pass down (FIG. 4C) when the earth terminals 3 are disposed in parallel with the earth end attaching member 2 (FIG. 4A) and the earth terminals 3 are pressed down lightly (FIG. 4B). The earth terminals 3 are lapped on the earth end attaching member 2 so that the holes 6 are coaxially positioned. The latch portions 12 engage with the both sides of the earth terminals 3 by the elastic force of the parts 5A and 5B (FIG. 4D). The earth terminals 3 are prevented from falling out of the earth end attaching member 2 by the engagement of the latch portions 12.

The earth terminal 3 is connected to the ends of two parallel earth leads 7 at juxtaposed wire barrels 13. The latch portions 12 of the elastic engaging parts 5A and 5B engage with the wire barrels 13. The earth end attaching member 2 is provided with a guide protrusion 14 which stabilizes the wire barrels 13 therebetween. Openings 20 in the member 2 on both sides of the guide protrusion 14 are formed by drawing the protector 1 from a mold after mold-forming.

As shown in FIGS. 4A to 4D, when the earth terminals 3 connected to the earth leads 7 are drawn from the formed protector 1 and pressed down to the earth end attaching member 2 by a light force, the elastic engaging parts 5A and 5B are elastically deflected and the earth terminals 3 are lapped on the earth end attaching member 2 "with a clink". The latch portions 12 of the elastic engaging parts 5A and 5B hold the terminals 3 in the lapped and fixed position. This fixing construction for the earth terminals 3, including the elastic engaging parts 5A and 5B as main elements, is simpler in construction and lower in cost than that of the prior formed protector.

Figure 3:
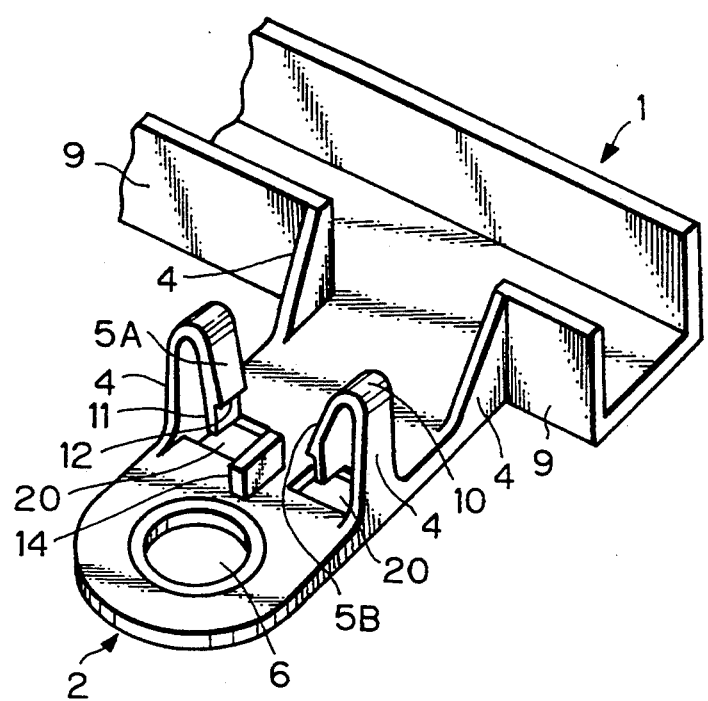
FIG. 3 is a perspective view of another embodiment of the earth end attaching member.

Another embodiment of the present invention will be explained by referring to FIG. 3. The earth end attaching member 2 in this embodiment has the same engaging plates 4 and elastic engaging parts 5A and 5B as those of the first embodiment. The engaging plates 4 stand vertically and oppose each other on both sides of the earth end attaching member 2. The base ends 10 of the elastic engaging parts 5A and 5B are integrally connected to the top of the engaging plates 4 so that they form a reversed U-shape.

Similar to the first embodiment shown in FIG. 1, the latch portions 12 of the elastic engaging parts 5A and 5B engage with the earth terminals 3 so that the terminals 3 are lapped and secured to the earth end attaching member 2. Since the second embodiment shown in FIG. 3 forms the reversed U-shaped bend lever comprising the engaging plate 4 and elastic engaging parts 5A or 5B increase an elasticity of the elastic engaging parts more than the first embodiment, thereby readily fixing the earth terminals 3 on the member 2 by a single action.

It should be understood that the present invention is not limited to the above embodiments. The earth terminal 3 may be connected to a single earth lead 7. The latch portions 12 of the elastic engaging parts 5A and 5B may engage with any side portions of the earth terminals 3.

It will be apparent from the foregoing that the earth end attaching member in the formed protector for the wire harness in accordance with the present invention enables mounting of the earth terminals in a single action and results in an improvement in working operations.

What is claimed is:

1. An earth end attaching member in a formed protector for a wire harness, on which earth terminals of earth leads are lapped and secured, comprising:
    a pair of engaging plates integrally formed on said member in spaced and opposed positions; and
    a pair of cantilever like elastic engaging parts, each part being provided on the opposing wall of each engaging plate so that a base end thereof is disposed at an upper position and a free end thereof is directed downwardly, each part having an elastic latch portion provided on the free end;
    a spaced distance allowing said earth terminals parallel to said member to be passed therethrough by elastically deforming said parts being defined between said parts;
    said latch portion engaging with a side of said earth terminals-lapped on said member.

2. An earth end attaching member according to claim 1 wherein the base end of said elastic engaging part is integrally formed on an upper end of said engaging plate so that a reversed U-shape is formed by said part and plate.

3. An earth end attaching member according to claim 1 or 2 wherein said latch portion is formed into a reversed L-shape by providing a shoulder on said free end of said elastic engaging part.

* * * * *